(12) United States Patent
Gómez

(10) Patent No.: US 7,422,177 B2
(45) Date of Patent: Sep. 9, 2008

(54) SEALING DEVICE FOR A FLAP TRACK IN A BELLY FAIRING OF AN AIRCRAFT FOR A FLAP-ACTUATING SHAFT

(75) Inventor: Ignacio Zamora Gómez, Madrid (ES)

(73) Assignee: Airbus Espana SL, Madrid (ES)

( * ) Notice: Subject to any disclaimer, the term of this patent is extended or adjusted under 35 U.S.C. 154(b) by 369 days.

(21) Appl. No.: 11/323,291

(22) Filed: Dec. 30, 2005

(65) Prior Publication Data
US 2006/0145013 A1    Jul. 6, 2006

(30) Foreign Application Priority Data
Dec. 31, 2004    (ES) ................ 200500028

(51) Int. Cl.
*B64C 1/06* (2006.01)
(52) U.S. Cl. ........... 244/131; 244/129.1; 244/129.4; 244/123.1; 244/213
(58) Field of Classification Search .......... 244/35 A, 244/123.1, 129.4, 131, 213, 217; 277/603, 277/606, 608, 616, 630, 637
See application file for complete search history.

(56) References Cited

U.S. PATENT DOCUMENTS

| | | | | |
|---|---|---|---|---|
| 2,405,726 A | * | 8/1946 | Zap | 244/216 |
| 2,984,506 A | * | 5/1961 | Andresen et al. | 277/371 |
| 3,031,198 A | * | 4/1962 | Hudson | 277/398 |
| 3,480,237 A | | 11/1969 | Appleby | |
| 3,486,720 A | * | 12/1969 | Seglem et al. | 244/210 |
| 3,917,194 A | | 11/1975 | Muller | |
| 4,434,959 A | * | 3/1984 | Rudolph | 244/215 |
| 4,618,109 A | * | 10/1986 | Victor | 244/130 |
| 5,161,757 A | * | 11/1992 | Large | 244/216 |
| 5,458,343 A | * | 10/1995 | Dornfeld et al. | 277/503 |
| 5,839,698 A | * | 11/1998 | Moppert | 244/217 |
| 6,299,108 B1 | * | 10/2001 | Lindstrom et al. | 244/213 |

FOREIGN PATENT DOCUMENTS

| | | |
|---|---|---|
| DE | 2011345 | 9/1971 |
| GB | 1508788 | 4/1978 |

* cited by examiner

*Primary Examiner*—Michael R. Mansen
*Assistant Examiner*—Philip J Bonzell
(74) *Attorney, Agent, or Firm*—Klauber & Jackson

(57) ABSTRACT

Sealing device for the flap track for the flap-actuating shaft, in the belly fairing of an aircraft, with a top hollow body 1 and a bottom hollow body 7 which are flexibly compressible, each comprising at least one interior chamber 2, 8 with open sides 2a, 2b, a wall 3, 9 with respective external contact surfaces 3a which are in flexible contact with each other, the outer surfaces 4a, 10a of the front walls 4, 10 of the hollow bodies 1, 7 jointly forming an outer sealing surface 11 which covers the flap track 19, said hollow bodies 1,7 having jointly a vertical compression flexibility such that the contact surfaces 3a, 9a retract around the actuating shaft 20, the interior chambers 2, 8 extending between the front walls 4, 10 and rear walls 5, 11 of the hollow bodies 2, 7.

10 Claims, 6 Drawing Sheets

SEALING DEVICE FOR A FLAP TRACK IN A BELLY FAIRING OF AN AIRCRAFT FOR A FLAP-ACTUATING SHAFT

RELATED APPLICATION

The present application claims priority from Spanish Application Ser. No. 200500028, filed on Dec. 31, 2004. Applicants claim priority under 35 U.S.C. §119 as to said Spanish application, the entire disclosure of which is incorporated herein by reference in its entirety.

TECHNICAL FIELD OF THE INVENTION

The present invention is encompassed within the technical field of devices for sealing shafts of mechanisms when passing through surfaces in aircraft, particularly within the sector of devices for sealing the flap track for the flap-actuating shaft which is located in the belly fairing of an aircraft.

STATE OF THE ART PRIOR TO THE INVENTION

In many types of airplanes, the flaps, in other words, the fin-shaped moving parts located on the rear edge of the wings of the airplane are connected, by means of actuating shafts which perpendicularly protrude beyond the belly fairing of the airplane, to actuating mechanisms which are located in the interior of the fuselage. The shaft actuating each flap emerges from the belly fairing of the aircraft through a flap track, the configuration of which, generally elongated and curved downward, adapts to the path which the actuating shaft has to follow for moving the flap from a substantially horizontal position, corresponding to the position of the flap in cruising flight, to a position in which the rear edge of the flap is shifted downward, corresponding to the position of the flap in descent maneuvers. Apart from the above, the configuration of the flap track also adapts to the outer, generally curved shape of the belly fairing of the aircraft.

The need of providing the flap tracks of the type described hereinabove entails that when the flaps are in the positions corresponding to cruising flight, a large area of the flap tracks is left uncovered, allowing air to flow into the inside of the belly fairing of the aircraft, which causes losses in the aerodynamic efficiency and the corresponding increase in fuel consumption, as well as bothersome annoyances due to the noise caused by the flow of air which is diverted towards the inside of the chamber of the belly fairing of the aircraft.

Although it has been attempted to provide a solution to these drawbacks, for example, by means of stiff ramps actuated by the movement of the actuating shaft itself, which slide over rails installed over the panels of the dynamic surface to be sealed, none of the known systems is a truly satisfactory solution. It was therefore a desirable goal to find a sealing system which would fulfill the requirements of:

Maintaining a suitable quality of the aerodynamic surface in cruising flight and which would resist the pressure differentials generated while the aircraft is in operation.

Providing a sealing device which would resist the extremely high compression ratio due to the large dimensions and the complex geometry (double curve) of the flap track to be sealed and the diameter of the shaft passing through it, which would be flexible enough allow operation of the flap without putting resistance to movement thereof as well as stiff enough so as to resist the on-flight pressure loads being attached to the panels solely at one of its ends thereof, the other being left cantilevered.

Preventing the high compression ratio to cause the appearance of crackings in the sealing elements which would damage the durability of the sealing.

Prevent the accidental blocking of the forward movement of the flap, as the stability of the aircraft would be adversely affected in that case.

DESCRIPTION OF THE INVENTION

The present invention has the purpose of overcoming the drawbacks of the state of the art and achieving the aforementioned goal by means of a sealing device for the flap track in the belly fairing of an aircraft for the flap-actuating shaft, the actuating shaft being capable of shifting its position from a first end to a second end of the flap track, the device comprising sealing means covering the flap track, with a flexibly compressible top hollow body comprising at least one inner chamber with open sides delimited at the bottom by a bottom wall with an outer bottom contact surface,
a front wall with an outer surface which covers at least a first part of the flap track;
a rear wall,
a top wall; and
a flexibly compressible bottom hollow body which comprises at least one inner chamber with open sides and delimited at its top by a top wall with an outer top contact surface; with
a front wall with an outer surface which covers at least a second part of the flap track;
a rear wall,
a bottom wall; and
said contact surfaces being in flexible contact with each other;
the outer surfaces of the front walls of the hollow bodies having extensions such that they jointly form an outer sealing surface capable of covering the flap track;
said hollow bodies jointly having a flexibility under vertical compression such that the contact surfaces retract around the actuating shaft; and
the inner chambers extending between said front and rear walls.

The hollow bodies may be of plastic materials, such as rubber, silicone rubber, eventually treated, etc. which combine flexibility with a sufficient degree of stiffness and which are resistant to the temperature changes which take place while the aircraft is on flight.

According to the invention, the top hollow body may have top attaching means which can be mounted at a top area of a panel crossed by the flap track, whilst the bottom hollow body can be provided with bottom attaching means, which can be mounted at a bottom area of the panel crossed by the flap track. These attaching means provided respectively at each of the hollow bodies may be metal profiles, for example "L"-shaped profiles joined, for example, by means of riveting or screwing, respectively to the top wall of the top hollow body and to the bottom wall of the bottom hollow body. When the profile is an "L"-shaped profile, the surface of the branch of the "L" profile which is not joined to any of the walls of the hollow bodies forms a continuation of the outer sealing surface. The attaching means may also be flanges formed as a continuation of the outer surface of each hollow body, or a perimetral rib which laterally emerges from each body. By means of these flanges or ribs, which may eventually be provided with reinforcements, the top body and the bottom body may be secured in a manner known per se on the panel by means of screwing, riveting and/or stapling.

Preferably, the height of the upper assembly of the top and bottom parts of the device is larger than the vertical extension of the flap track, given in this manner a larger compression volume is available.

In a preferred embodiment of the invention, at least one of the hollow bodies has a plurality of chambers formed by means of partitions which extend between the front wall and the rear wall of the top and bottom hollow body. In this way, a longitudinal reinforcement, and a flexible folding in the form of a bellows which is more uniform around the actuating shaft, are achieved in addition to that breakings of crackings in the top or bottom wall leading to ripping of the entire top or bottom body is avoided. Instead of or in addition to the partitions, longitudinal ribs emerging from inside of the front and rear walls may be provided.

BRIEF DESCRIPTION OF THE FIGURES

A description is provided in following of aspects and embodiments of the invention in relation to some drawings which are an integral part of the present description. In these drawings.

Figure 1:
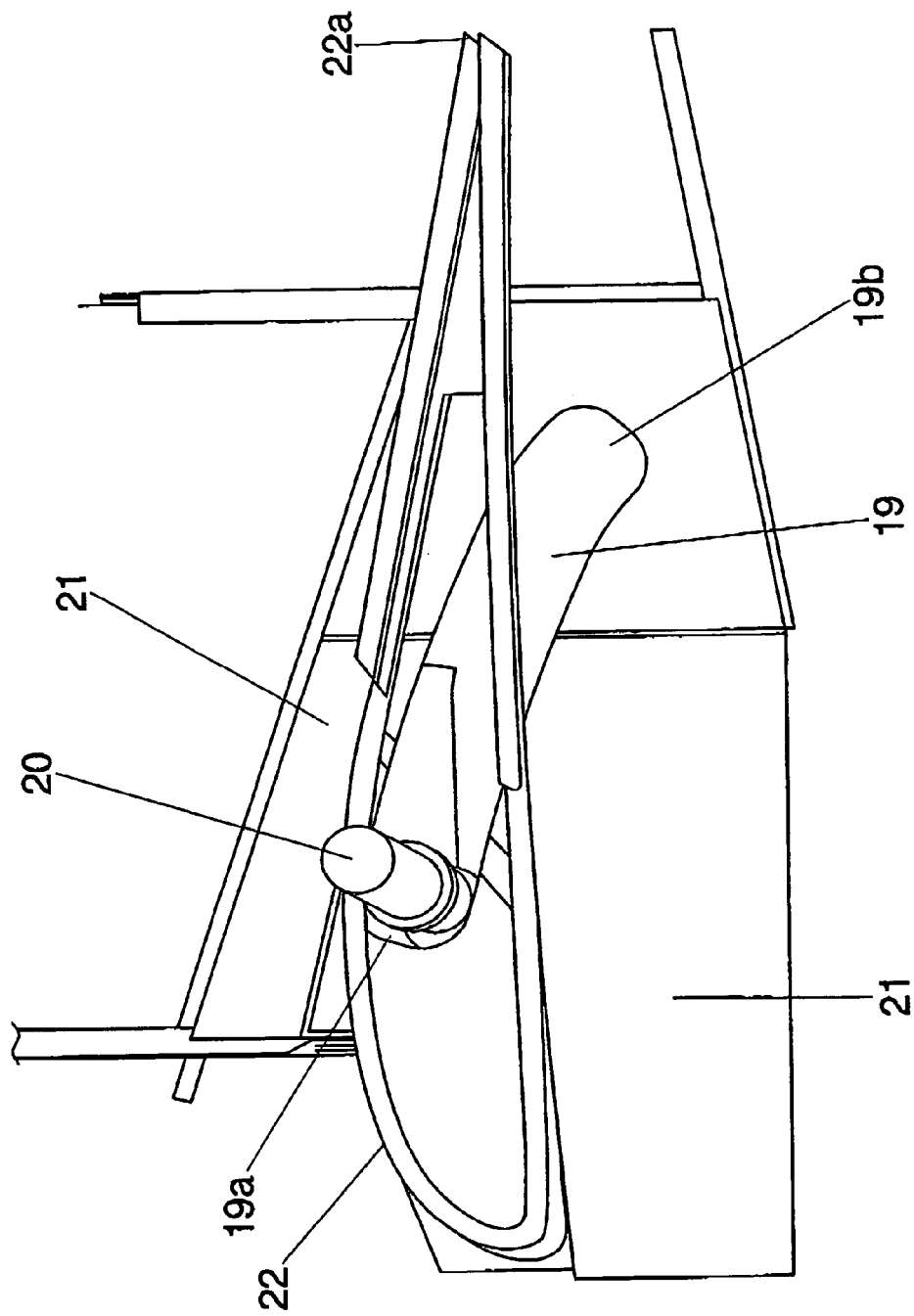
FIG. 1 is a schematic cross-sectional view of the location of the flap track on the belly fairing of an aircraft.

These figures include numerical references identifying the following elements:
1. top hollow body
2, 2' inner chamber of the top hollow body
2a, 2b open sides of chamber 2
3 bottom wall of the top hollow part
3a contact surface of the top wall
4 front wall of the top hollow part
4a outer surface of the front wall
5 rear wall
6 top wall
7 bottom hollow body
8, 8' inner chamber of the bottom hollow body
8a, 8b open sides of chamber 8
9 top wall of hollow body 7
10 front wall of the bottom hollow body
10a outer surface of the front wall
11 rear wall of the bottom hollow body
12 bottom wall of the bottom hollow body
13 top attaching means
14 bottom attaching means
15 partitions inside the top body
16 partitions inside the bottom body
17 ribs inside the top body
18 ribs inside the bottom body
19 flap track
19a first end of the flap track
19b second end of the flap track
20 actuating shaft
21 belly fairing panel
22 flap
22a back edge of the flap

EMBODIMENTS OF THE INVENTION

FIG. 1 shows a flap track 19 for the actuating shaft 20 for a flap 22 in a panel 21 of the belly fairing of an aircraft. For actuating the flap 21, the actuating shaft 20 moves from a first end 19a to a second end 19b of the flap track 19. The actuation of the shaft 20 makes the back edge 22a of the flap 22 raise.

Figure 2:
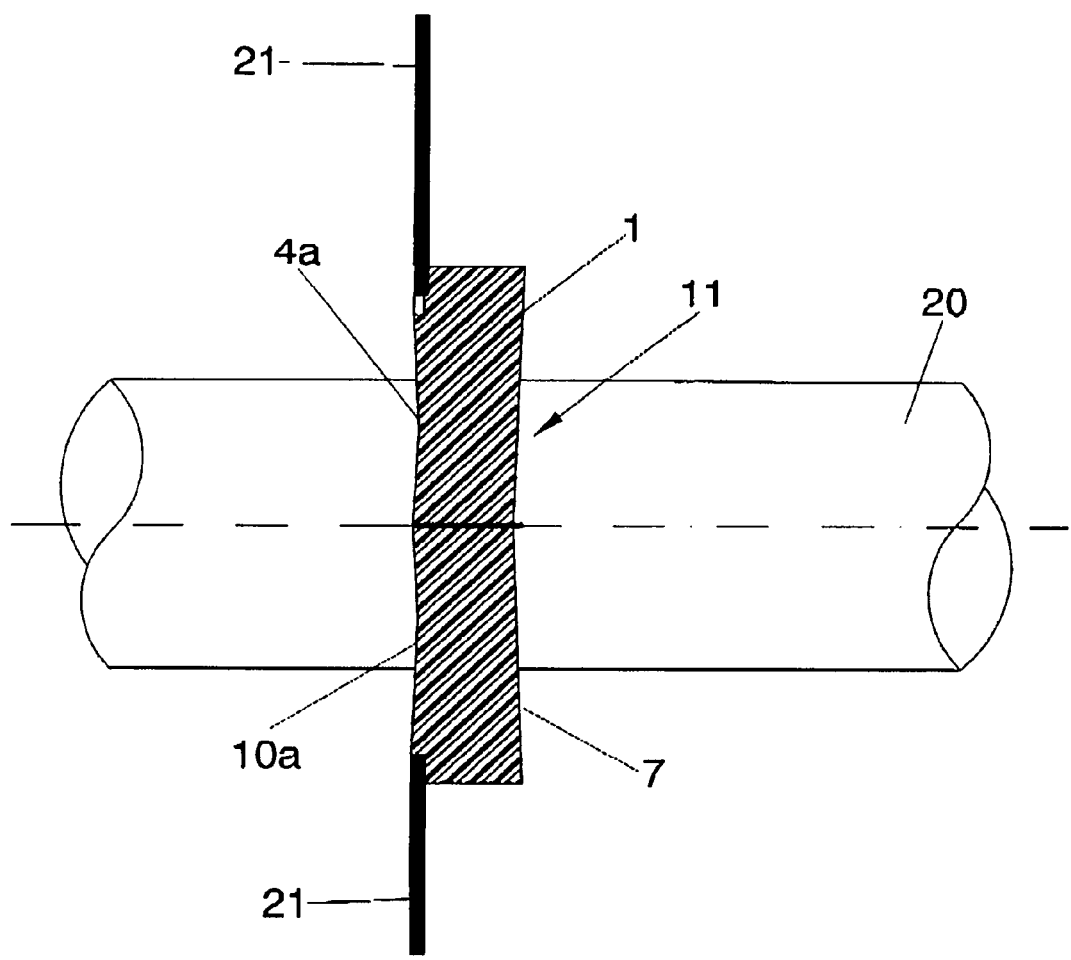
FIG. 2 is a schematic cross-sectional side view of one part of the belly fairing of an aircraft showing the mounted position of the sealing device.
Figure 3:
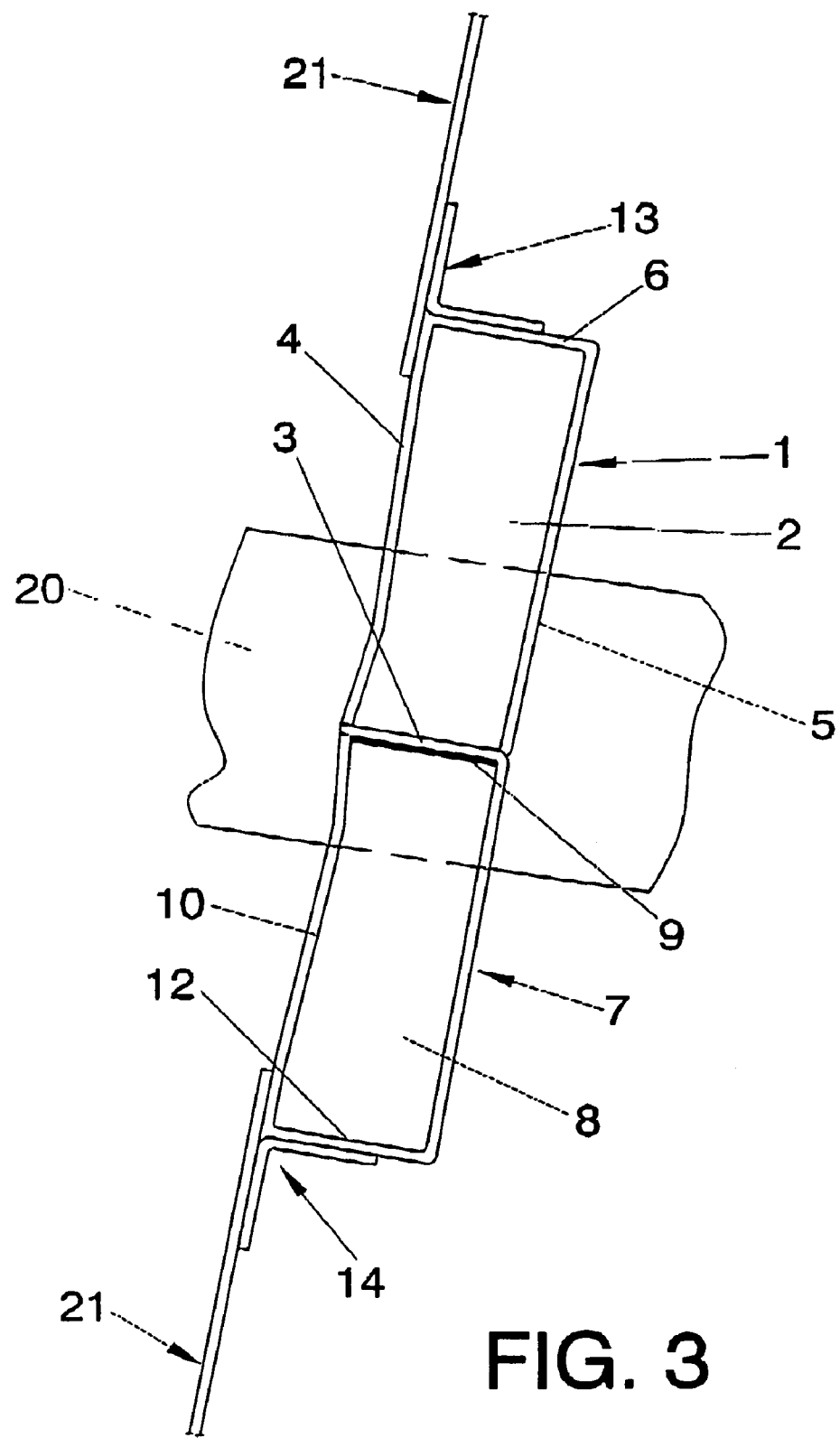
FIG. 3 is a schematic cross-sectional view of a first embodiment of the sealing device of the present invention.
Figure 4:
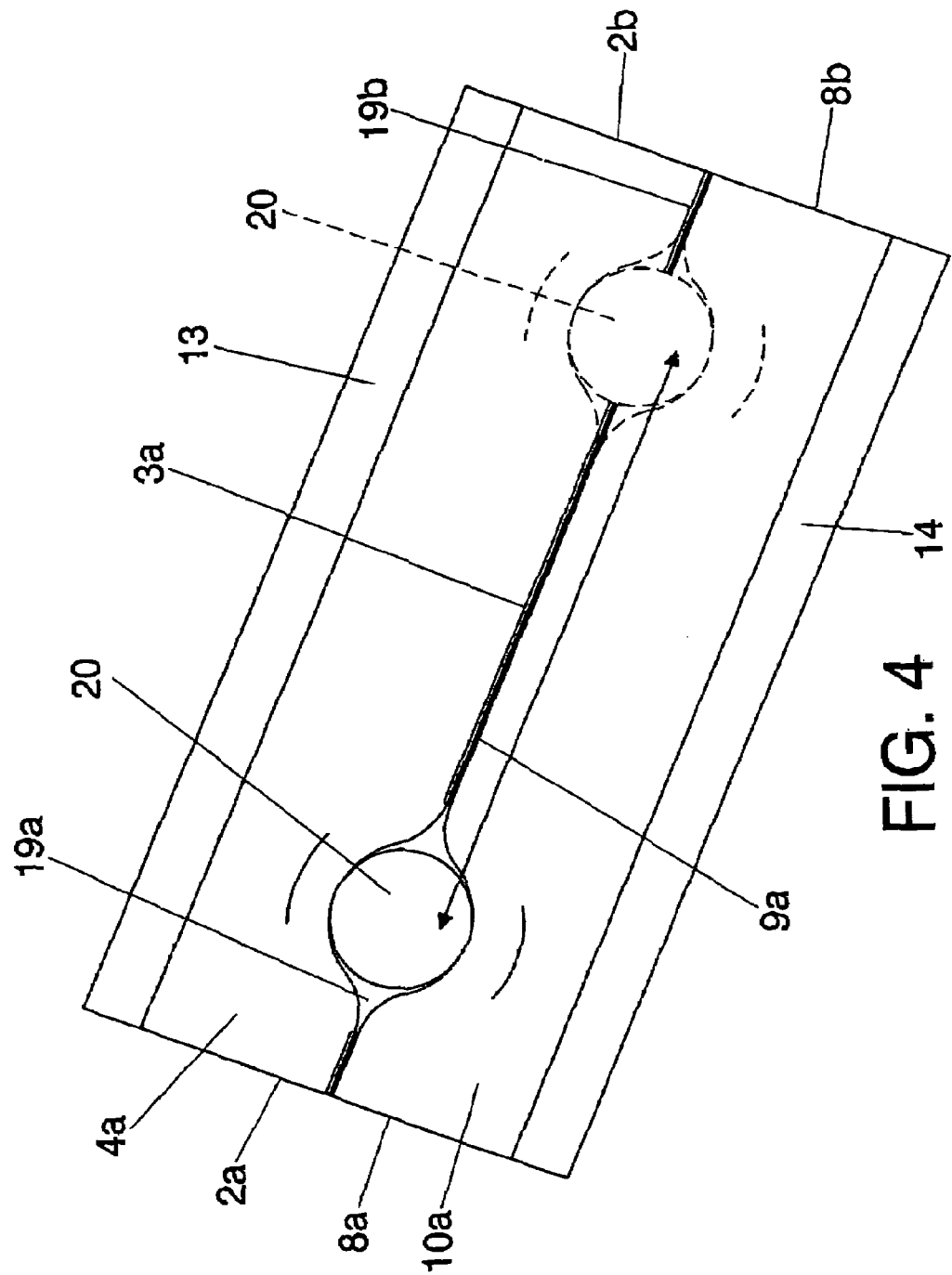
FIG. 4 is a schematic front elevation view of the device shown in FIG. 3.

FIGS. 2 to 4 show a device comprising a compressible top hollow body 1 comprising a top inner chamber 2 with open sides 2a, 2b delimited at the bottom by a bottom wall 3 with a lower outer contact surface 3a. Likewise, the top body 1 has a front wall 4 with an upper outer surface 4a which covers at least a first part of the flap track 19, a rear wall 5 and a top wall 6. At its top, the top hollow body 1 comprises top attaching means 13, which can be mounted in a top area of the panel 21 which is crossed by the flap track 19. These top attaching means 13 comprise an "L"-shaped metal profile joined to the top wall 6 of the top hollow body 1 by one of its branches, whilst its other branch forms a continuation of the top outer surface 4a.

The device also comprises a bottom hollow body 7, which is also flexibly compressible, of a configuration analogous to that of the top hollow body. Thus, the bottom hollow body comprises a bottom inner chamber 8 with open sides 8a, 8b and delimited at the top by a top wall 9 with an outer contact surface 9a. Likewise, the top hollow body has a front wall 10 with a bottom outer surface 10a which covers at least a second part of the flap track 19, a rear wall 11 and a bottom wall 12. The bottom hollow body 7 comprises bottom attaching means 14, which can be mounted on a bottom area of the panel 21 which is crossed by the flap track 19. These bottom attaching means 14 comprise a bottom "L"-shaped metal profile joined to the bottom wall 12 of the bottom hollow body 1 by one of its branches, whilst the front surface of its other branch forms a continuation of the top outer surface 10a.

The inner chambers 2, 8 extend between the front walls 4, 10 and rear walls 5, 11 and the outer surfaces 4a, 10a of the front walls 4, 10 of the hollow bodies 1, 7 have extensions such that they jointly form a outer sealing surface 11 which covers the flap track 19.

The hollow bodies 1, 7 jointly have a vertical compression flexibility such that the contact surfaces 3a, 9a retract around the actuating shaft 20, whilst, on the extension on which the actuating shaft 20 is not located, the contact surfaces 3a, 9a are in flexible contact with each other. Hence, on movement between the ends 22a, 22b of the flap track 22, in other words, between the left and right positions (shown in dotted lines) of the actuating shaft 20 which are shown in FIG. 4, the actuating shaft 20 progressively separates the contact surfaces 3a, 9a which recover contact with each other in the position in which the actuating shaft 20 is not located, which means that the flap track 19 is kept closed.

Figure 5:
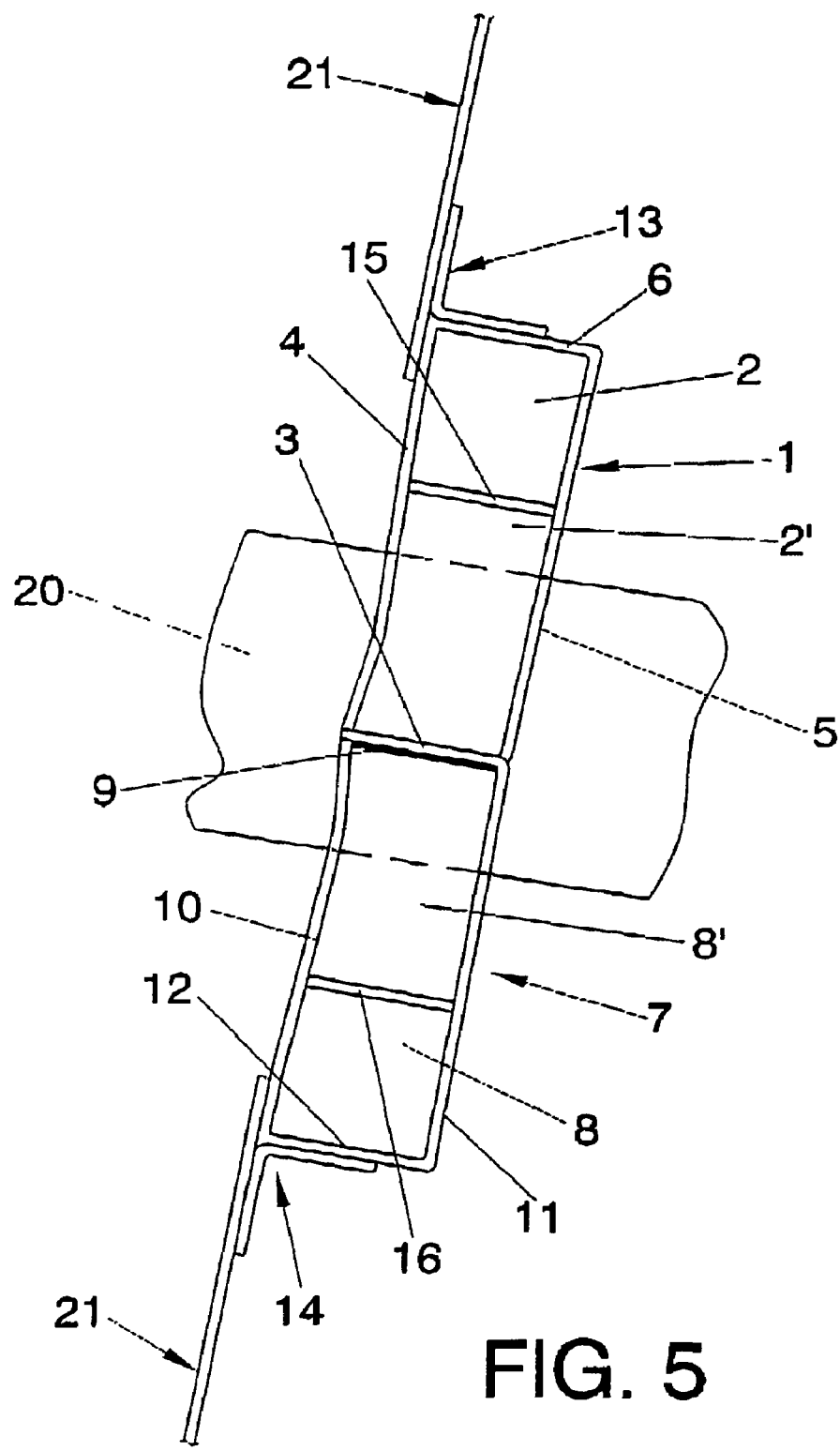
FIG. 5 is a schematic cross-sectional view of a second embodiment of the sealing device of the present invention.

FIG. 5 shows a second embodiment of the device of the present invention in which the top body 1 comprises a plurality of horizontally superimposed upper chambers 2, 2', formed by means of partitions 1 which extend between the front wall 4 and the rear wall 5 of the top hollow body 1. In turn, the top body 7 comprises a plurality of horizontally superimposed lower chambers 8, 8' formed by means of partitions 16 which extend between the front wall 10 and the rear wall 11 of the bottom hollow body 7. By means of this embodiment, a longitudinal reinforcement and a flexible, bellows-type folding is achieved which is more uniform around the actuating shaft 20, in addition to avoiding that a break or crack in the top wall 3 or bottom wall 9 from may lead to ripping of the entire top body 2 or bottom body 7.

Figure 6:
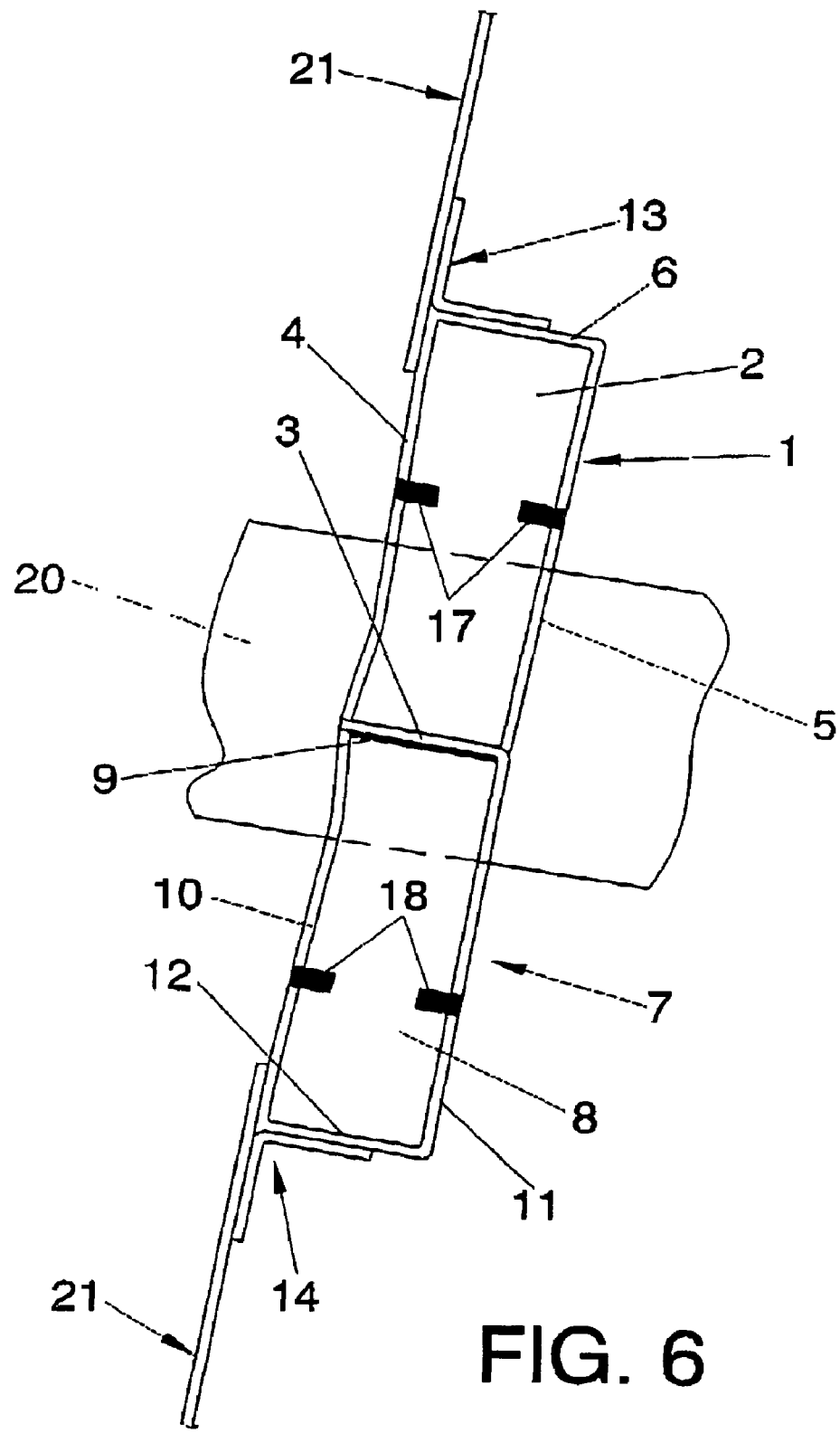
FIG. 6 is a schematic cross-sectional view of a third embodiment of the sealing device of the present invention.

FIG. 6 shows a third embodiment of the device of the present invention according to which the top body 1 comprises a plurality of longitudinal ribs 17 parallel to each other which emerge towards the inside of the upper chamber 2 from the front wall 4 and the rear wall 5 of the top hollow body 1. Likewise, the bottom body 7 comprises a plurality of longitudinal ribs 17 being parallel to each other, which emerge towards the inside of the lower chamber 8 from the front wall 10 and the rear wall 11 of the bottom hollow body 7. The longitudinal ribs contribute to reinforcing the longitudinal stiffness of the device without interfering in its flexible compressibility.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. Sealing device for a flap track in a belly fairing for an actuating shaft of a flap of an aircraft the actuating shaft, the actuating shaft being capable of moving from a first end to a second end of the flap track, the device comprising a flexibly compressible top body comprising at least one upper inner chamber with open sides and delimited at the bottom by a bottom wall with an lower outer contact surface, a front wall with an upper outer surface which covers at least a first part of the flap track;

a rear wall, a top wall; and a flexibly compressible bottom body comprising at least one lower inner chamber with open sides and delimited at the top by a top wall with an upper outer contact surface;

a front wall with a lower outer surface which covers at least a second part of the flap track;

a rear wall;

a bottom wall;

said contact surfaces being in flexible contact with each other;

the outer surfaces of the front walls of the hollow bodies having extensions such that they jointly form an outer sealing surface which can cover the flap track;

said hollow bodies jointly having a vertical compression flexibility such that the contact surfaces retract around the actuating shaft; and the inner chambers extending between said front walls and rear walls.

2. Sealing device according to claim 1, wherein the top hollow body comprises top attaching means which mountable on a top area of a panel crossed by the flap track, and wherein the bottom hollow body comprises bottom attaching means which are mountable at a bottom area of the panel crossed by the flap track.

3. Sealing device according to claim 2, wherein the top attaching means comprise a top "L"-shaped profile joined to the top wall of the top hollow body by one of its branches.

4. Sealing device according to claim 3, wherein the top profile is arranged such that the branch not joined to the top wall forms with its front surface a continuation of the upper outer surface.

5. Sealing device according to claim 2, wherein the bottom attaching means comprise a bottom "L"-shaped profile joined to the bottom wall of the bottom hollow body by one of its branches.

6. Sealing device according to claim 5, wherein the top metal profile is arranged such that the branch which is not joined to the bottom wall forms with its front surface a continuation of the upper outer surface.

7. Sealing device according to claim 1, wherein the top body comprises a plurality of horizontally superimposed upper chambers formed by means of partitions which extend between the front wall and the rear wall of the top hollow body.

8. Sealing device according to claim 1, wherein the bottom body comprises a plurality of horizontally superimposed lower chambers formed by means of partitions which extend between the front wall and the rear wall of the bottom hollow body.

9. Sealing device according to claim 1, wherein the top body comprises a plurality of longitudinal ribs being parallel to each other, which emerge towards the inside of the upper chamber from at least one of the front wall and the rear wall of the top hollow body.

10. Sealing device according to claim 1, wherein the bottom body comprises a plurality of longitudinal ribs being parallel to each other, which emerge towards the inside of the lower chamber from at least one of the front wall and the rear wall of the bottom hollow body.

* * * * *